(12) United States Patent
Falkenå

(10) Patent No.: US 8,612,610 B2
(45) Date of Patent: Dec. 17, 2013

(54) IP MULTIMEDIA SERVICE PROVISION

(75) Inventor: Jonas Falkenå, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 13/148,085

(22) PCT Filed: Feb. 10, 2009

(86) PCT No.: PCT/EP2009/051515
§ 371 (c)(1),
(2), (4) Date: Aug. 22, 2011

(87) PCT Pub. No.: WO2010/091719
PCT Pub. Date: Aug. 19, 2010

(65) Prior Publication Data
US 2011/0296040 A1    Dec. 1, 2011

(51) Int. Cl.
*G06F 15/16*    (2006.01)
(52) U.S. Cl.
USPC .......................... 709/228; 709/219; 455/403
(58) Field of Classification Search
USPC ............... 709/228, 219; 370/389; 455/403
See application file for complete search history.

(56) References Cited

U.S. PATENT DOCUMENTS

| | | | | |
|---|---|---|---|---|
| 7,275,243 | B2 * | 9/2007 | Gibbons et al. | 717/159 |
| 8,250,477 | B1 * | 8/2012 | Schwarzberg et al. | 715/760 |
| 8,504,644 | B2 * | 8/2013 | Shu et al. | 709/217 |
| 2004/0243680 | A1 * | 12/2004 | Mayer | 709/206 |
| 2005/0083929 | A1 * | 4/2005 | Salo et al. | 370/389 |
| 2007/0038723 | A1 | 2/2007 | Gourraud | |
| 2007/0197260 | A1 * | 8/2007 | Randall et al. | 455/557 |
| 2008/0066089 | A1 * | 3/2008 | Kamiya et al. | 719/328 |
| 2009/0225760 | A1 * | 9/2009 | Foti | 370/400 |
| 2012/0196582 | A1 * | 8/2012 | Ahn et al. | 455/415 |
| 2012/0322470 | A1 * | 12/2012 | Said et al. | 455/466 |

FOREIGN PATENT DOCUMENTS

| WO | WO 2006/070067 | * 7/2006 | G06F 15/16 |
|---|---|---|---|
| WO | 2006/125471 A1 | 11/2006 | |
| WO | 2008/139031 A1 | 11/2008 | |

\* cited by examiner

*Primary Examiner* — Joseph Avellino
*Assistant Examiner* — James Conaway
(74) *Attorney, Agent, or Firm* — Coats & Bennett, P.L.L.C.

(57) ABSTRACT

A method of operating an IP Multimedia Subsystem user terminal to facilitate user services over a communication network comprising an IP Multimedia Subsystem network. The method comprises receiving a SIP message and parsing the message to identify a generic service identifier. Upon identification of said generic service identifier, either a web link within the message body is identified and a web browser session to said web link established, or web page content contained within the message body is identified and displayed.

15 Claims, 3 Drawing Sheets

IP MULTIMEDIA SERVICE PROVISION

TECHNICAL FIELD

The present invention relates to IP Multimedia Service provision and in particular to a method and apparatus for enabling the provision of new services with minimal implementation requirements, particularly in respect of the user terminals.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the 3rd Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criterion for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select a S-CSCF if a S-CSCF is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases.

A major issue with deploying IMS on a global scale is the need for user terminal support for IMS services. According to conventional approaches, for each new service, e.g. Push-to-talk over Cellular (PoC), Multimedia Telephony (MMTel), presence, etc, there is a corresponding impact on the terminal which means that in order to launch a new service the terminal vendor community must be convinced that the service is sound both from a technical and a business perspective. This means that it is difficult to introduce and adapt services to fulfil the needs for specific use cases. Rather, it is necessary to make use of the standardised services in different contexts. This leads to slower feature development as well as making it more difficult for service providers to differentiate themselves.

SUMMARY

It is an object of the present invention to provide a means for deploying new services, and adapting existing services, within an IMS context, which mitigates the problem identified above. This object is achieved by specifying a new, generic IMS service or application. When a user terminal receives a SIP message corresponding to the generic service, it reacts by connecting to a web link contained within the message. This web link opens a browser window containing a graphical user interface for a service. A new service can therefore piggyback on the generic service or application.

According to a first aspect of the present invention there is provided a method of operating an IP Multimedia Subsystem user terminal to facilitate user services over a communication network comprising an IP Multimedia Subsystem network. The method comprises receiving a SIP message and parsing the message to identify a generic service identifier. Upon identification of said generic service identifier, either a web link within the message body is identified and a web browser session to said web link established, or web page content contained within the message body is identified and displayed.

The step of parsing the message body to identify a generic service identifier may comprise identifying a generic service identifier included as a feature tag within the SIP message header. This could be one of an ICSI and IARI identifier.

The SIP message sent to the user terminal may be a SIP MESSAGE, NOTIFY or INVITE message.

According to a second aspect of the present invention there is provided a user terminal configured to provide an IP Multimedia Subsystem client for interacting with an IP Multimedia Subsystem network. The user terminal comprises a receiver for receiving from said IP Multimedia Subsystem network a SIP message, and a message parser for parsing a received SIP message to determine whether or not the message contains a generic service identifier. The terminal further comprises a service client configured, in the event that it is determined that a message contains a generic service identifier, to either identify within said message body a web link and establish a web browser session to said web link, or identify and display web page content contained within the message body.

The message parser may be configured to parse a SIP message to identify said generic service identifier as a feature tag of the SIP message header.

The generic service identifier may be a feature tag, for example one of an ICSI and IARI identifier.

According to a third aspect of the present invention there is provided a method of facilitating user services over a communication network comprising an IP Multimedia Subsystem network. The method comprises, at a web server, generating a SIP message including a generic service identifier and, within a body of the message, either a web link or web page content, and sending the SIP message towards an IP Multimedia Subsystem user.

DETAILED DESCRIPTION

Figure 1:
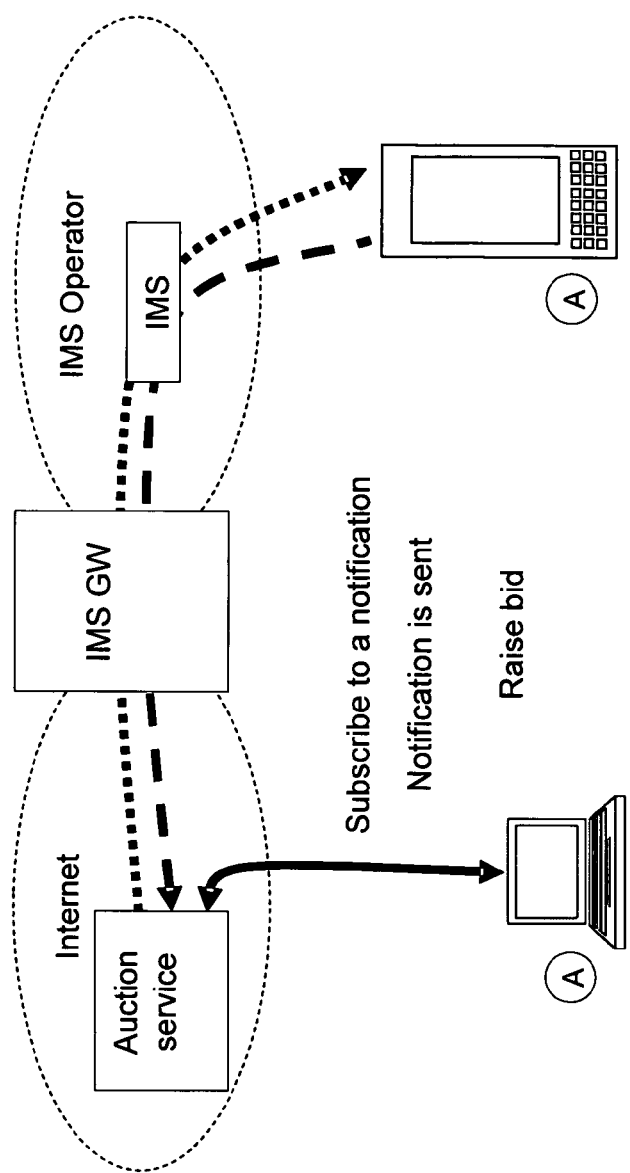
FIG. 1 illustrates schematically components involved in an IMS facilitated auction service.

As has been discussed above, introducing new IMS based services and modifying existing services is difficult due to a perceived need to introduce into user terminals a dedicated software client for each service. A simple solution to this problem is to take advantage of a terminal's web browser to present a graphical user interface that is quickly and easily configurable on the service provider side.

IMS services are identified by a feature tag that is included within an Accept-Contact header of a SIP message. Feature tags are registered with the Internet Assigned Numbers Authority (IANA) to ensure uniqueness. An early example of an IMS feature tag is "+g.poc.talkburst" registered in respect of the Push-to-talk over Cellular service. According to current IMS specifications, new feature tags comprise an IMS Communication Service Identifier (ICSI) or an IMS Application Reference Identifier (IARI). Typically, the ICSI identifies an Application Server (AS) within the IMS network that implements the corresponding service, whilst an IARI can identify a particular application (client) within a terminal that can be used to handle a service. The IARI is useful where multiple applications or clients can be used to handle the same service.

It is proposed here to specify a new feature tag, for example . . . service/application . . . , and register this with IANA. This can be an IARI or an ICSI. A corresponding software generic client is then installed in user terminals. A user terminal receiving a SIP message will parse the message to identify the presence of a feature tag. If the generic feature tag is present, the terminal will activate the generic client. The generic client will then parse the message body to identify a web link (URL). Assuming that such a web link is found, the generic client opens a web browser in the terminal, and causes the browser to open a session using the URL. This in turn downloads a web page for display by the web browser which provides, for the user, a graphical user interface (GUI) for a particular service. It may be preferable to format the display such that only the contents of the web browser window is displayed, i.e. without displaying the web browser buttons, etc. In this case, the user does not perceive the GUI as a web browser window, but rather perceives it as another IMS service GUI.

It is of course possible to access a web page from any user terminal (having a web browser and access to a data service) using standard cellular data services. For example, a service provider might send a web link to a user terminal using the Short Message Service (SMS), with the user selecting the link to download a GUI into the terminal's web browser window. Such an approach cannot however benefit from the advantages of the IMS. IMS notifications are delivered to the user in near real-time unlike SMS messages. Moreover, an SMS-like approach would make use of a "best-effort" IP connection to transport web data between the service provider and the user. The approach described here in contrast makes use of the IMS established bearer providing an enhanced user experience.

Figure 2:
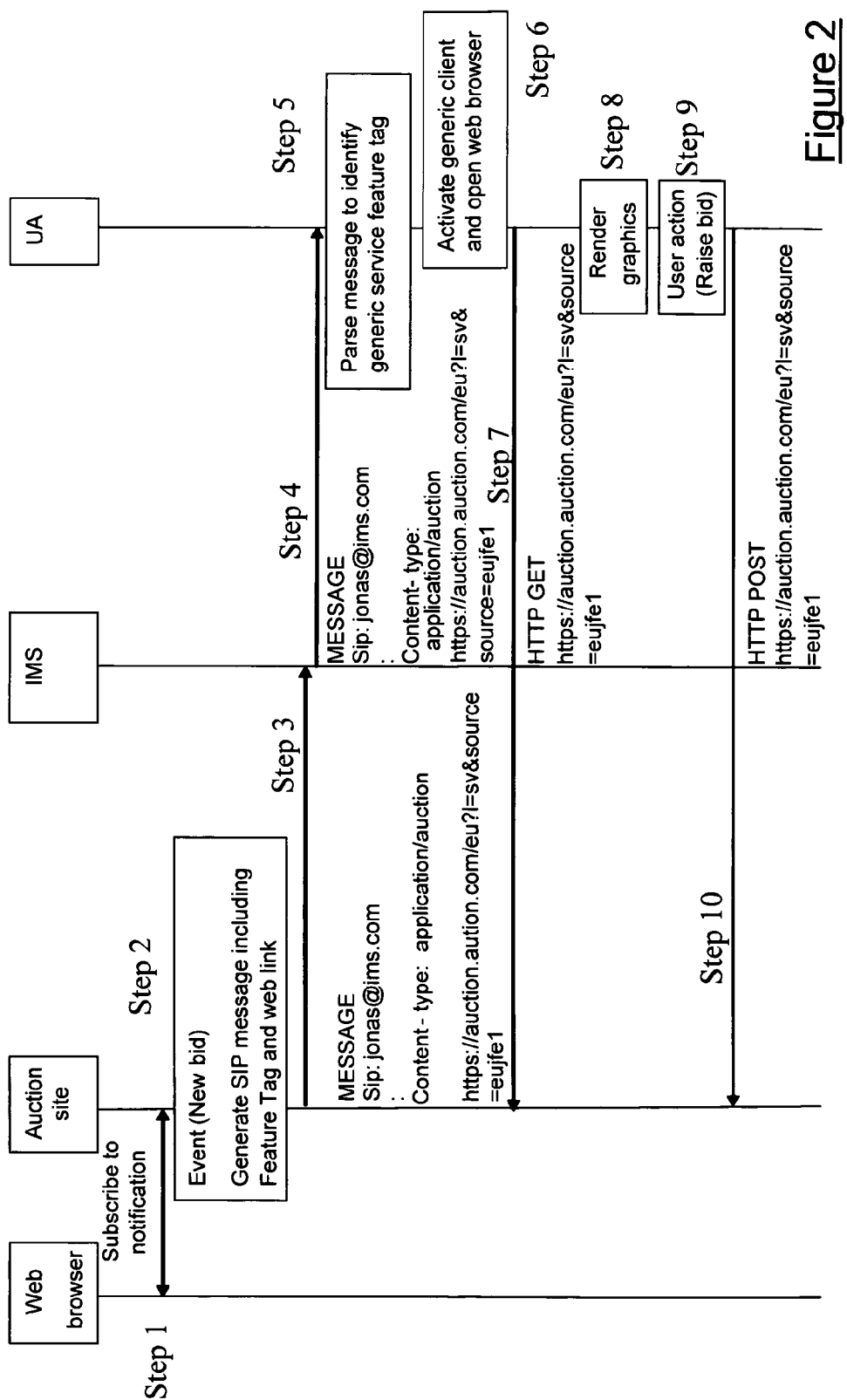
FIG. 2 shows signalling and process steps involved in an IMS facilitated auction service.

FIG. 1 illustrates schematically an example scenario in which a user makes use of a laptop and a mobile IMS terminal to participate in an online auction. FIG. 2 shows a call flow illustrating the mechanism for providing the auction service by piggybacking on the generic IMS service. It is assumed that an end user has a pc connected to the Internet, and a user terminal having an IMS UA that is currently registered with the user's home IMS network. The end user (that is a subscriber to the IMS network) uses a web browser, installed for example in his pc, to register with a web service hosted on a web server. This service could be, for example, an online auction site, in which case the user may make a bid on a particular product (step 1). It is further assumed that the web server has a special web interface to the IMS network (although the web server could also be a SIP AS or include an IMS client).

The bid is logged by the web server. In the event that a higher bid is received from another end user, in order to notify the earlier bidder, the web server sends generates a SIP message (step 2) and sends this to a SIP URI of the bidder (step 3). This message can be sent using any suitable SIP method, although it can be expected that the method will be one of MESSAGE, INVITE, and NOTIFY. The SIP address has the form name.imsoperator.com. The message includes as a feature tag the generic feature tag, in this example "service/auction". The web server also includes within the SIP message body (as text) a web link (URL). The link may map to a location on the web server, or to another web server.

The SIP message is received by the home IMS network of the bidder. Nodes within the IMS handle the SIP message according to operator and subscriber policies, and forward the message to the UA via an access network (step 4). Upon receipt of the SIP message, the IMS client parses the message as described above (step 5). It identifies the generic feature tag, and activates the generic client which in turn open the terminal's web browser (step 6). The client sends a HTTP GET request (step 7) to the URL contained in the message body, and receives the response(s) from the web server. The generic client displays the web page in the browser window (step 8). The user can now interact with the service by using the "buttons"/links etc contained within the browser window. Selecting a button (step 9) may result in an HTTP POST (or PUT) command being sent towards the web server (step 10). It will be appreciated that while the web page may be downloaded over the Internet, i.e. using a general packet data service, it may be beneficial to do this via a tunnel established across the IMS network. This may provide, for example, an improved quality of service or increased security.

Figure 3:
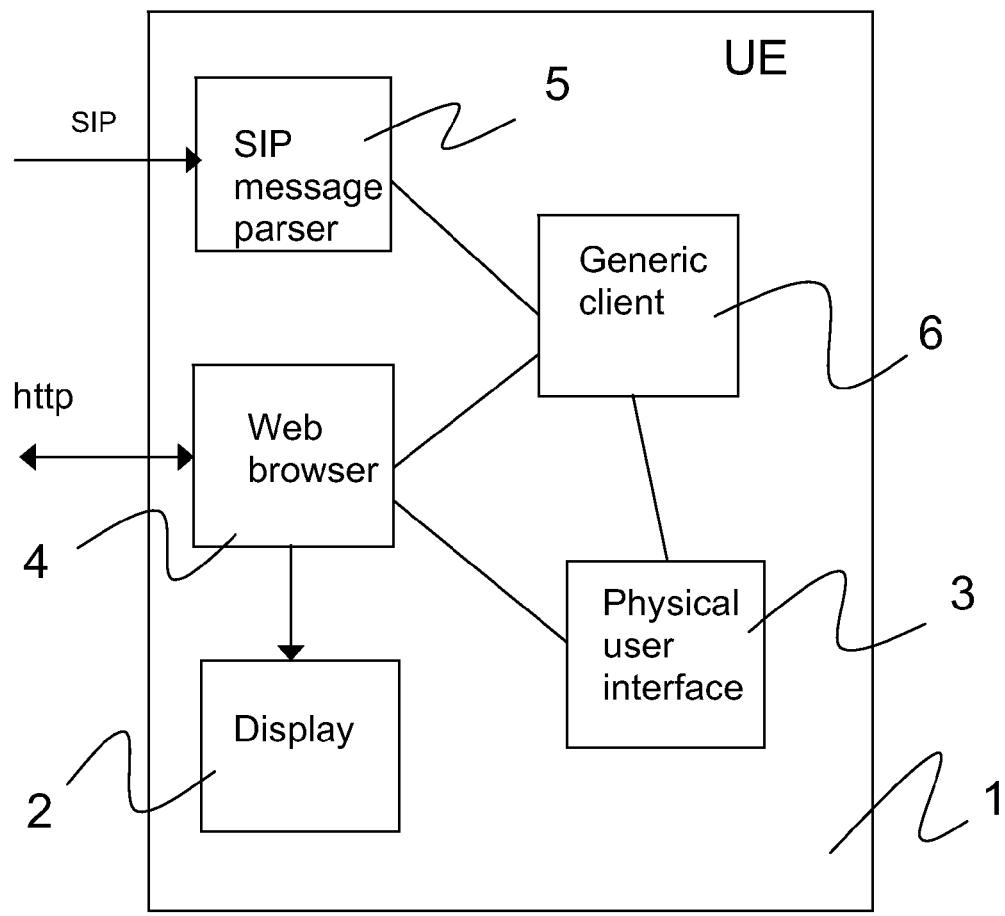
FIG. 3 illustrates schematically a user terminal enabled with an enhanced IMS service.

FIG. 3 illustrates schematically components of a user terminal 1 adapted for use with this enhanced IMS service. This user terminal might be, for example, a cellular telephone or smart phone. However, the terminal need not have wireless access, and it could make use of a fixed access network connection, e.g. broadband. The terminal 1 comprises an essentially standard display 2 and physical user interface 3, e.g. keypad, touch screen, etc, and is provided with web browser software 4. The SIP message parser 5 is configured, in addition to the current parsing requirements, to parse a received message for the new, generic feature tag. A Generic client 6 (provided in addition to other IMS service clients) responds to detection of the new feature tag by downloading the web GUI as described.

Figure 4:
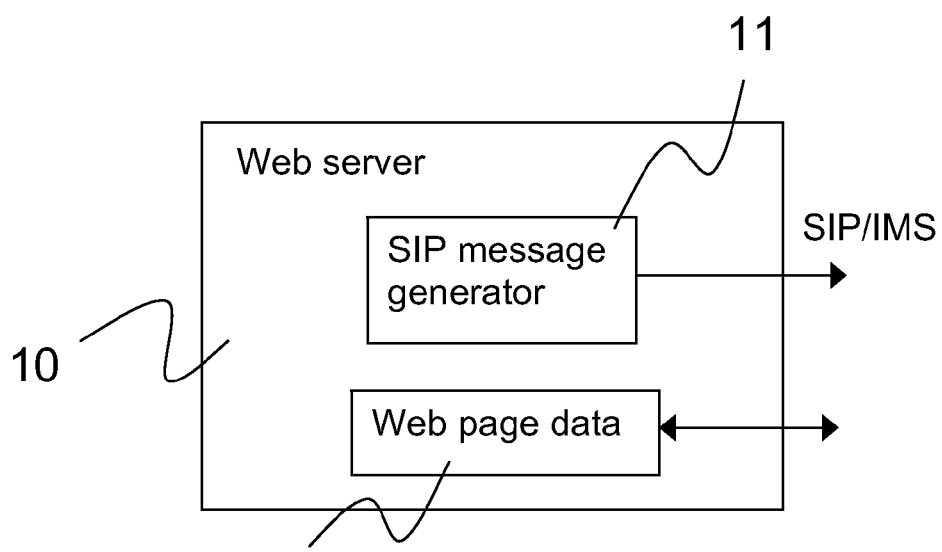
FIG. 4 illustrates schematically a web server for facilitating an enhanced IMS service.

FIG. 4 illustrates schematically certain components of the web server 10, including a SIP message generator 11 and a mechanism 12 for storing and supplying web page data. As described, the message generator 11 generates SIP messages containing the new feature tag, and, within the message body, a web link identifying a location corresponding to the mechanism 12.

It will be further appreciated that a service provider can introduce a new service without necessarily impacting on the IMS, either in terms of standards or implementation, as long as the generic feature tag has been specified. Similarly, a service provider can very easily modify the look and functionality of the service GUI, merely by designing a new web page and storing this on the web server.

It will be appreciated by the person of skill in the art that various modifications may be made to the above described embodiments without departing from the scope of the present invention.

The invention claimed is:

1. A method of operating an IP Multimedia Subsystem (IMS) user terminal to facilitate user services over a communication network comprising an IMS network, the method comprising:
 receiving a Session Initiation Protocol (SIP) message;
 parsing the SIP message to identify a generic service identifier, wherein the generic service identifier is an identifier associated with a generic service client at the IMS user terminal that generically supports multiple different IMS services; and
 upon identification of said generic service identifier:
 establishing a web browser session to said web link if the generic service client identifies a web link within a body of the SIP message, and
 displaying web page content contained within the body if the generic service client identifies the web page content within the body of the SIP message.

2. The method according to claim 1, wherein parsing the SIP message to identify a generic service identifier comprises identifying a generic service identifier included as a feature tag within a header of the SIP message.

3. The method according to claim 2, wherein said generic service identifier is one of an IMS Communication Service Identifier (ICSI) and an IMS Application Reference Identifier (IARI).

4. The method according to claim 1, wherein said SIP message is a SIP MESSAGE, NOTIFY or INVITE message.

5. An IP Multimedia Subsystem (IMS) user terminal configured to provide an IMS client for interacting with an IMS network, the IMS user terminal comprising:
 a receiver for receiving from said IMS network a Session Initiation Protocol (SIP) message;
 a message parser implemented by one or more processors at the IMS user terminal, the message parser configured to parse the SIP message to determine whether or not the SIP message contains a generic service identifier; and
 a generic service client implemented by one or more processors at the IMS user terminal, the generic service client associated with the generic service identifier and configured to generically support multiple different IMS services, wherein the
 generic service client is configured, if the message parser determines that the SIP message contains the generic service identifier, to:
 establish a web browser session to said web link if the generic service client identifies a web link within a body of the SIP message, and
 display web page content contained within the body if the generic service client identifies web page content within the body of the SIP message.

6. The IMS user terminal according to claim 5, wherein said message parser is configured to determine that the SIP message contains a generic service identifier if a header of the SIP message contains a generic service identifier that comprises a feature tag of that header.

7. The IMS user terminal according to claim 6, wherein said generic service identifier is one of an IMS Communication Service Identifier (ICSI) and an IMS Application Reference Identifier (IARI).

8. The IMS user terminal according to claim 5, wherein said SIP message is a SIP MESSAGE, NOTIFY or INVITE message.

9. A method implemented by a web server for facilitating user services over a communication network comprising an IP Multimedia Subsystem (IMS) network, the method comprising:
 generating a Session Initiation Protocol (SIP) message to include a generic service identifier and, within a body of the SIP message, either a web link or web page content, wherein the generic service identifier is an identifier associated with a generic service client at an IMS user terminal that generically supports multiple different IMS services; and
 sending the SIP message towards an IMS user terminal that is configured, upon identifying the generic service identifier, to establish a web browser session to said web link if the generic service client identifies the web link within the body of the SIP message and to display said web page content if the generic service client identifies the web page content within the body of the SIP message.

10. The method of claim 9, wherein said generating comprises generating the SIP message to include the generic service identifier as a feature tag within a header of the SIP message.

11. The method of claim 10, wherein said generic service identifier is one of an IMS Communication Service Identifier (ICSI) and an IMS Application Reference Identifier (IARI).

12. The method according to claim 9, wherein said SIP message is a SIP MESSAGE, NOTIFY or INVITE message.

13. The method of claim 1, wherein the web browser session or the displayed web page content provides a graphical user interface for a specific one of the different IMS services generically supported by the generic service client.

14. The IMS user terminal of claim 5, wherein the web browser session or the displayed web page content provides a graphical user interface for a specific one of the different IMS services generically supported by the generic service client.

15. The method of claim 9, wherein the web link or the web page content provides a graphical user interface for a specific one of the different IMS services generically supported by the generic service client.

\* \* \* \* \*